United States Patent [19]
Kato

[11] Patent Number: 4,836,101
[45] Date of Patent: Jun. 6, 1989

[54] PRESSING MACHINE
[75] Inventor: Heizaburo Kato, Shizuoka, Japan
[73] Assignee: Sankyo Manufacturing Co., Tokyo, Japan
[21] Appl. No.: 137,024
[22] Filed: Dec. 23, 1987
[30] Foreign Application Priority Data
Apr. 21, 1987 [JP] Japan .............................. 62-60465[U]
[51] Int. Cl.$^4$ .......................... B30B 15/30; F16H 7/10
[52] U.S. Cl. ...................................... 100/215; 474/89; 474/112; 474/113
[58] Field of Search ................... 100/214, 215; 474/58, 474/88, 89, 112, 113

[56] References Cited
U.S. PATENT DOCUMENTS

| | | | |
|---|---|---|---|
| 1,218,686 | 3/1917 | Morse | 474/112 |
| 2,245,925 | 6/1941 | Klaucke | 474/112 X |
| 2,479,617 | 8/1949 | Hawley et al. | 474/89 |
| 2,621,530 | 12/1952 | Siegerist | 474/112 |
| 3,145,575 | 8/1964 | Bellmann | 474/58 |
| 3,869,934 | 3/1975 | Pierce | 474/113 X |
| 4,063,499 | 12/1977 | Johnson | 100/215 |
| 4,614,507 | 9/1986 | Ishino | 474/112 X |

Primary Examiner—Philip R. Coe
Assistant Examiner—Stephen F. Gerrity

[57] ABSTRACT

A pressing machine has a drive pulley secured to a press crank shaft, an intermediate shaft parallel to the press crank shaft and an input shaft of a material feeding device, the intermediate shaft being supported by a tension adjusting device which is rotatably supported by the crank shaft and the input shaft of the material feeding device, a first intermediate pulley which is secured to one end of the intermediate shaft and is drivingly connected to the drive pulley through a first endless torque transmission device, and a second intermediate pulley which is secured to the other end of the intermediate shaft and is drivingly connected to an input pulley secured to the input shaft of the material feeding device through a second endless torque transmission device. The tension adjusting device has a first arm member capable of effecting expansion and contraction and having one end rotatably supported by the crank shaft, a second arm member having one end rotatably supported by the input shaft of the material feeding device, and an eccentric body which is provided between the other ends of the first and second arms and the intermediate shaft so as to enable the relative position therebetween to be adjusted.

3 Claims, 5 Drawing Sheets

F I G. 6
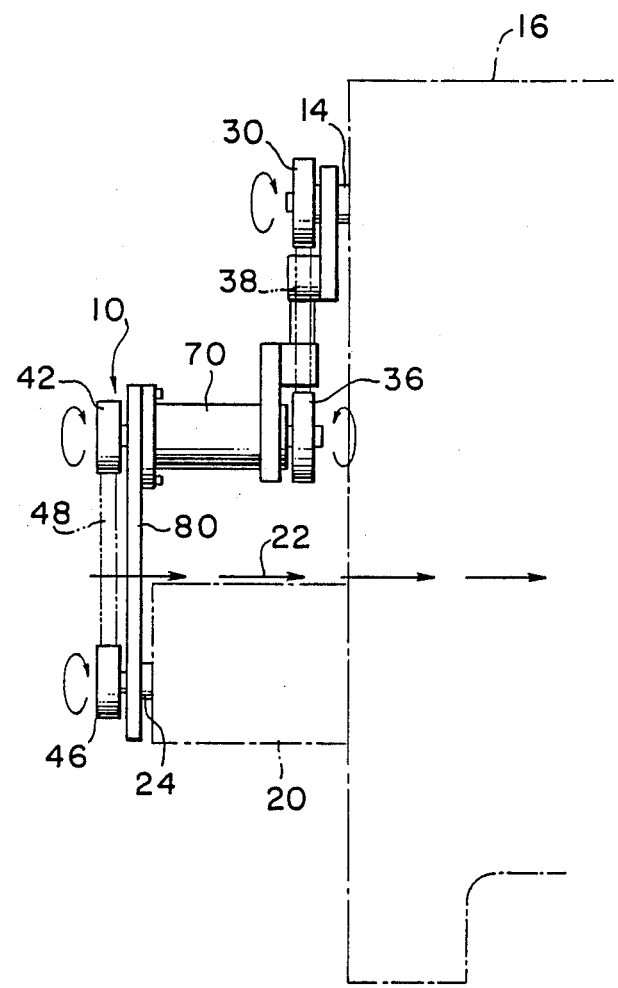

PRESSING MACHINE

BACKGROUND OF THE INVENTION

1. Field of the Invention

This invention relates to an improvement in a pressing machine of the type which comprises a press crank shaft which is rotatably supported by a housing and is adapted to be driven by a motor to rotate, a material feeding device which feeds a material in synchronization with the rotation of the crank shaft and is adapted to move toward and away from the crank shaft, and a torque transmission device which drivingly connects the crank shaft with an input shaft of the material feeding device.

2. Description of the Prior Art

One form of the conventional torque transmission device of the pressing machine described above employs endless transmission means such as a chain or a belt, while another type employs a gear and a shaft drive. However, in a wrapping connector driving type torque transmission device utilizing the endless transmission means, the operation may become impossible if the distance between two shafts is greatly varied because of the looseness of the chain or the belt. For this reason, a tension pulley is needed to adjust the degree of looseness during the operation. However, since this tension pulley is secured to a press housing or the housing of a material feeding device, it's use is limited in terms of the space needed for installation. Furthermore, the preset tension must be adjusted whenever the distance between the two shafts is changed. The synchronized relationship between the drive shaft and the follower shaft may deteriorate when the looseness of the belt or the chain is adjusted by means of the tension pulley. When the endless transmission means is employed, the side of the endless transmission means which is loose is determined by the direction of rotation of the pulley. Therefore, the tension pulley must be positioned on the loose side so as to be able to adjust this tension and it's position must be changed when the direction of rotation is reversed. As a result of this, the structure becomes complicated and the manufacturing cost is raised.

In a transmission device in which a gear and shaft drive are used, the transmission is conducted through a spline or a universal joint which is used for the purpose of adjusting the distance between the two shafts. In this type of the transmission device, however, backlash necessarily results, whereby the precision deteriorates, synchronization is not fulfilled, and the rotation becomes irregular. Further, it is necessary to provide a space for securing a gear box and the shafts to the housing or provide a space for the housing for supporting the same as in the case of the wrapping connector driving type transmission device. Furthermore, since the number of transmission elements from the driving side to the follower side is large, the time required for installing and detaching them is considerable.

SUMMARY OF THE INVENTION

An object of the present invention is to provide a pressing machine having a torque transmission mechanism which is capable of overcoming the aforementioned problems of the prior art.

In order to achieve the aforementioned object, the present invention provides a pressing machine including a press crank shaft rotatably supported by a press housing and adapted to be driven by a motor, a material feeding device which feeds a material in synchronization with the rotation of the crank shaft and is capable of moving toward and away from the crank shaft, and a torque transmission device for drivingly connecting the crank shaft and an input shaft of the material feeding device, the pressing machine comprising a drive pulley secured to one end of the crank shaft, an intermediate shaft disposed in parallel to the crank shaft and the input shaft of the material feeding device. The intermediate shaft is rotatably supported by a tension adjusting device having one end rotatably supported by the crank shaft and the other end rotatably supported by the input shaft of the material feeding device. A first intermediate pulley is secured to one end of the intermediate shaft and disposed at a position corresponding to the drive pulley. The first intermediate pulley is drivingly connected to the drive pulley through first endless torque transmission means, and a second intermediate pulley is secured to the other end of the intermediate shaft and drivingly connected to an input pulley secured to the input shaft of the material feeding device through second endless torque transmission means. The tension adjusting device includes a first arm member capable of effecting expansion and contraction and having one end rotatably supported by the crank shaft, a second arm member having one end rotatably supported by the input shaft of the material feeding device, and an eccentric body having an inner hole formed in an eccentric relationship with an outer circumference thereof, the eccentric body rotatably supporting the intermediate shaft in the inner hole thereof and being inserted into the other end of the first arm member and the other end of the second arm member in such a manner that the position of the eccentric body relative to the first and the second arm members can be adjusted in the direction of rotation.

According to the invention, the position of the intermediate shaft with respect to the crank shaft and the input shaft of the material feeding device can be varied by adjusting the expansion and contraction of the first arm member and adjusting the position in the direction of rotation of the eccentric body with respect to the first arm member and the second arm member. As a result of this, the tension applied to two endless torque transmission means can be suitably adjusted. Once the tension has been adjusted, the tension applied to the two endless torque transmission means does not change when the input shaft is moved toward and away from the crank shaft, because the distance between the crank shaft and the intermediate shaft and the distance between the intermediate shaft and the input shaft do not change. Due to this structure, no complex readjustment is needed when the input shaft of the material feeding device is displaced.

The two endless torque transmission means are swingably supported by the crank shaft and the input shaft of the material feeding device through the intermediate shaft. The two endless torque transmission means are supported by the housing through the crank shaft and the input shaft, but the intermediate shaft does not need to be supported by the housing. As a result of this, the following advantages are obtainable:

(1) The problem of the space limitation is solved, as a result of which the space available for various other purposes can be enlarged.

(2) Installation and removal can be conducted easily.

(3) The size of the device can be kept compact. Adjustment of the synchronization when the positional relationship between the drive shaft and the follower shaft is changed is unnecessary because the synchronized relationship between the two shafts can be kept unchanged. As a result, loss of working time can be prevented. Furthermore, backlash in the driving system which would cause irregular rotation and a shift or inconsistency in synchronization can be prevented.

BRIEF DESCRIPTION OF THE DRAWINGS

FIG. 6 is a view of the pressing machine shown in FIG. 5 when viewed from another direction.

DETAILED DESCRIPTION OF THE PREFERRED EMBODIMENT

Referring to the accompanying drawings, an embodiment of the present invention will now be described.

Those skilled in the art will understand that as an alternative to the belt used as the endless torque transmission means in this embodiment, a similar means such as a chain can also be employed.

Figure 5:
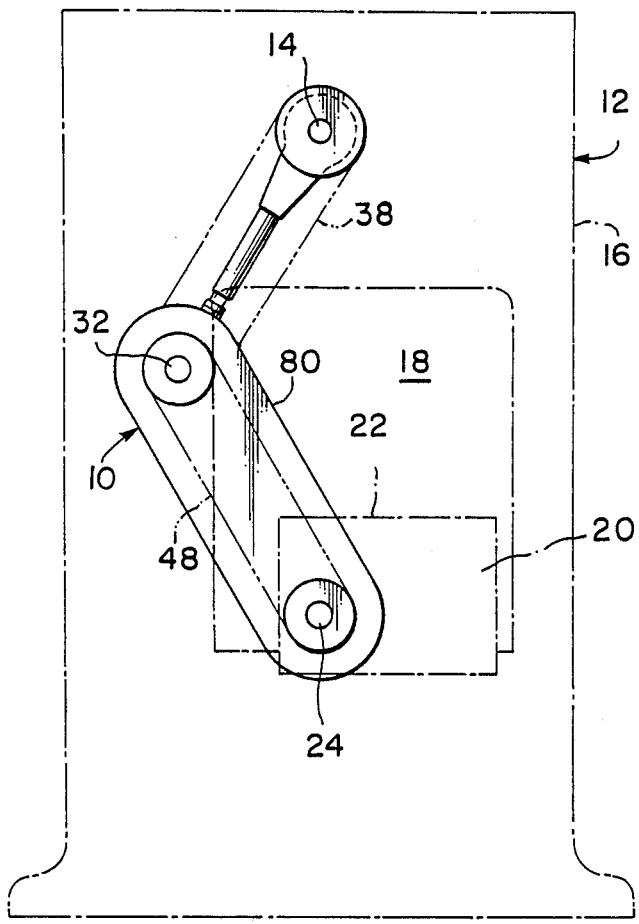
FIG. 5 is a schematic view of the pressing machine having the torque transmission device.

FIGS. 5 and 6 show a pressing machine 12 of the type described above having a torque transmission device 10. A press crank shaft 14 is rotatably supported by a housing 16 and is driven to rotate by a motor which is omitted from illustration. A material feeding device 20 is installed in a working space 18 of the pressing machine 12. This material feeding device 20 is capable of moving vertically with respect to the crank shaft 14. This arrangement is adopted, as is known, because of the necessity for displacement of a material feeding route 22 with respect to pressing members (omitted from illustration) in accordance with the shape and size of the article to be press-formed.

An input shaft 24 of the material feeding device 20 is drivingly connected with the crank shaft 14 through the torque transmission device 10.

Figure 1:
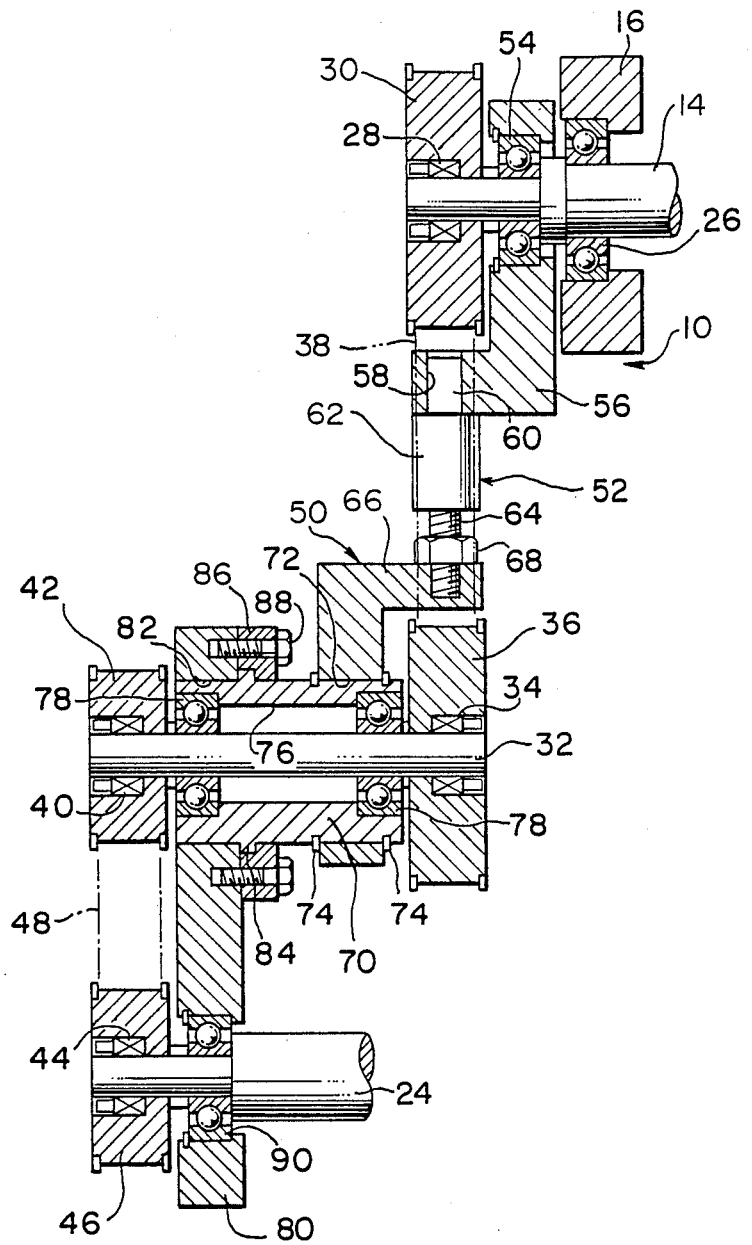
FIG. 1 is a cross-sectional view illustrating the detail of a torque transmission device of a pressing machine according to an embodiment of the present invention.

Referring particularly to FIG. 1, the torque transmission device 10 is shown in detail. The torque transmission device 10 comprises a drive pulley 30 secured by means of a shaft clamping device 28 o the outer end of the crank shaft 14 which is rotatably supported by the housing 16 through a bearing 26. The drive pulley 30 is drivingly connected through first endless torque transmission means, that is, a belt 38 to a first intermediate pulley 36 which is secured by a shaft clamping device 34, which is similar to the shaft clamping device 28 described above, to one end portion of the intermediate shaft 32. A second intermediate pulley 42 is secured to the other end of the intermediate shaft 32 by means of a shaft clamping device 40 which is similar to the shaft clamping devices 28 and 34. The second intermediate pulley 42 is drivingly connected through second endless torque transmission means, that is, a belt 48, to an input pulley 46 which is secured to the outer end of the input shaft 24 by means of a shaft clamping device 44.

The intermediate shaft 32 is rotatably supported by a tension adjusting device 50 at a position between the crank shaft 14 and the input shaft 24 of the material feeding device 20. The tension adjusting device 50 comprises a first arm member 52 which is capable of expansion and contraction and hence is enabled to adjust the distance between the drive pulley 30 and the first intermediate pulley 36. The first arm member 52 comprises a first arm portion 56 one end of which is rotatably supported by the crank shaft 14 through a bearing 54, and a tension rod 62 having a small-diameter portion 60 which is rotatably received in a hole 58 formed in on the other end portion of the first arm portion 56. The other end of this tension rod 62 is a threaded portion 64 which is screw-fastened into a threaded hole formed in one end portion of a second arm portion 66 of the first arm member 52. The distance between the first arm portion 56 and the second arm portion 66 can be increased or decreased by rotating the tension rod 62 by virtue of the threaded connection with the second arm portion 66. A lock-nut 68 is screwed on the threaded portion 64 of the tension rod 62. The tension rod 62 can be locked with respect to the second arm portion 66 by tightening this lock-nut 68 against the second arm portion 66.

The second arm portion 66 of the first arm member 52 rotatably supports an eccentric body 70 at the other end. In the embodiment illustrated, the outer circumferential surface of the eccentric body 70 is slidably fitted into a through-hole 72 formed in the second arm portion 66, and retainer rings 74 stop the axial movement of the eccentric body 70. The eccentric body 70 is formed in a sleeve shape having an inner hole 76 therein which passes through the eccentric body 70 in the axial direction. Bearings 78 are installed at two ends of the inner hole 76. These bearings 78 rotatably support the intermediate shaft 32 which extends in the axial direction of the inner hole 76. As a result of this, the intermediate shaft 32 is rotatably supported in parallel with the crank shaft 14.

Figures 2, 3:
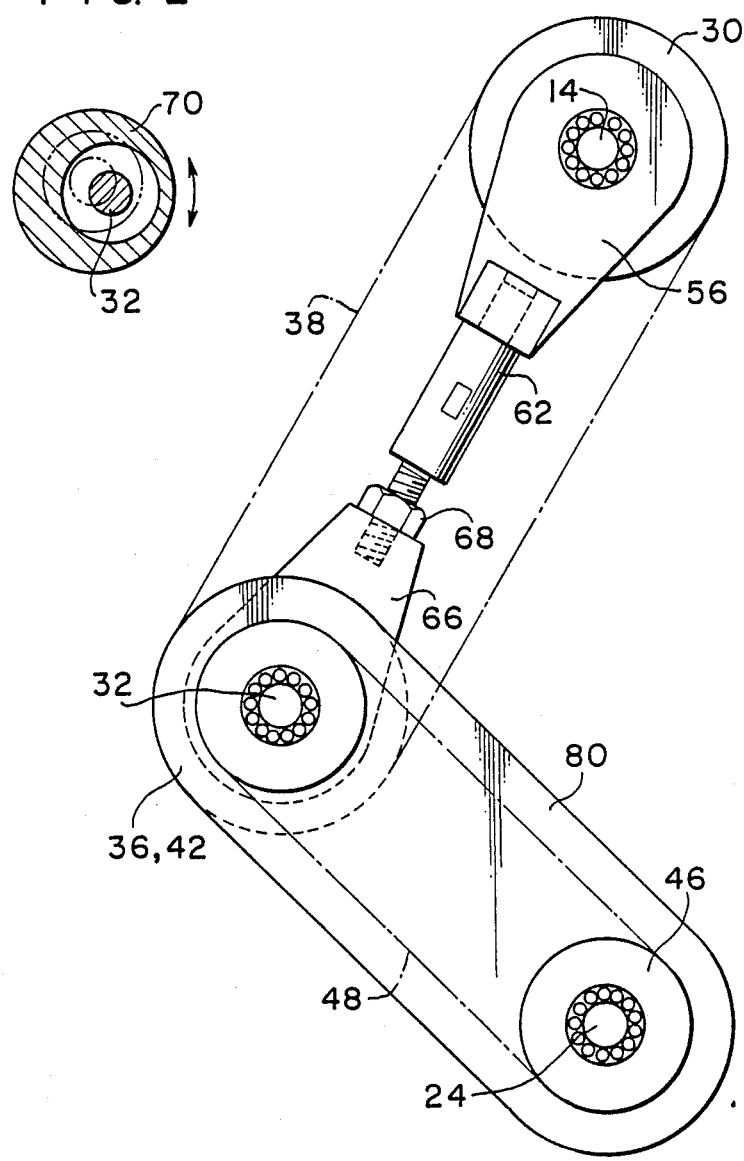
FIG. 2 is a cross-sectional view illustrating the relationship between an eccentric body and an intermediate shaft each of which is shown in FIG. 1.
FIG. 3 is a side elevational view of the torque transmission device shown in FIG. 1.

The outer circumferential surface of the eccentric body 70 and the inner hole 76 are disposed in an eccentric relationship with each other. This eccentric body 70, as shown in FIG. 2, supports the intermediate shaft 32 in an eccentric manner. Therefore, when the eccentric body 70 is rotated, the intermediate shaft 32 is caused to be displaced.

An adjusting plate 80 is secured in a release-free manner to the other end of the eccentric body 70. In the embodiment illustrated, an end of the eccentric body 70 is rotatably fitted into a through-hole 82 which is formed in one end portion of the adjusting plate 80. A circumferential projection 84 which is formed on the outer circumferential surface of the eccentric body 70 engages the part of the adjusting plate 80 adjacent to an inner end of the through-hole 82.

An annular fastening member 86 is capable of being fastened to the adjusting plate 80 by means of bolts 88 in such a manner that the circumferential projection 84 is interposed therebetween. As a result of this, the eccentric body 70 can be rotated relative to the adjusting plate 80 and the second arm portion 66 by loosening the bolts 88 and releasing the fastening member 86.

Another end of the adjusting plate 80 is rotatably connected to the input shaft 24 of the material feeding device 20 through a bearing 90.

Consequently, the intermediate shaft 32 can be displaced in a manner to retain parallel relationship with the crank shaft 14 and the input shaft 24 by relatively rotating this adjusting plate 80, the second arm portion 66 and the eccentric body 70, when the adjusting plate 80 is released. Thus, the tension of the belts 38 and 48 can be adjusted suitably in such a manner that no slippage of the belts 38 and 48 may occur by performing the following operation: adjusting the distance between the drive pulley 30 and the first intermediate pulley 36 by operating or rotating the tension rod 62; and adjusting the relative position of the eccentric body 70 in the rotational direction of the same with respect to the adjusting plate 80 and the second arm portion 66. Once the tensions of the belts 38 and 40 are adjusted in the manner described above, this tension is not changed when, for example, the input pulley 46 is moved, together with the input shaft 24, vertically as shown by the solid line and the chain line in FIG. 4. This is, as can be clearly seen from FIG. 4, due to the fact that the distance between the central axial line of the drive pulley 30 and the central axial line of the first-intermediate pulley 36 and the second intermediate pulley 42 is not changed, and that the distance between the central axial line of the first intermediate pulley 36 and the second intermediate pulley 42 and the central axial line of the input pulley 46 is not changed either. Therefore, no complicated adjustment is necessary after the distance between the axial lines of the drive shaft 14 and the input shaft 24 is changed.

Figure 4:
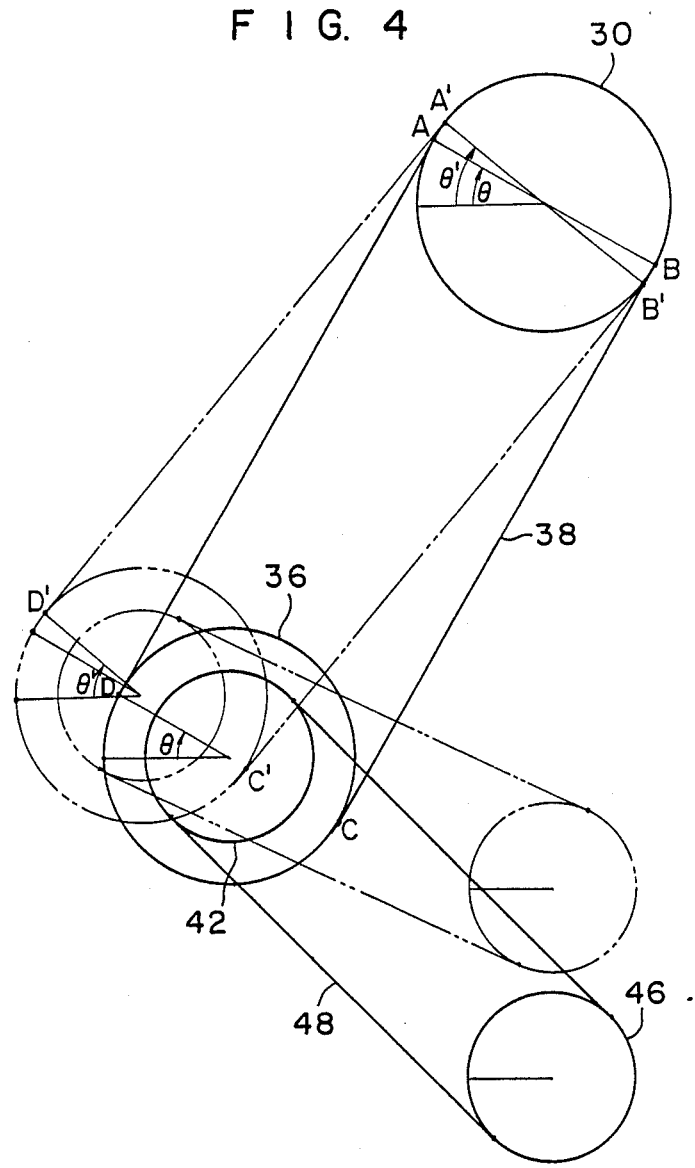
FIG. 4 is a view illustrating the state of each portion of the torque transmission device when the position of an input shaft of a material feeding device which is mounted in a pressing machine is shifted vertically.

FIG. 4 illustrates the fact that the state of synchronization between the drive shaft and the follower shaft, that is, between the crank shaft 14 and the input shaft 24, is not changed when the input pulley 46 is moved between the positions shown by the solid line and the chain line. In FIG. 4, A, B, C and D form a parallelogram, and A', B', C' and D' also form a parallelogram. In the case where the drive pulley 30 is fixed, if the pulley 46 is moved from the position shown by the solid line to the position shown by the chain line, the change in the point A of contact between the belt 38, which is wrapped around the drive pulley 30, and the pulley 30 is $\theta'-\theta$, but there is no relative movement between the belt 38 and the pulley 46. That is, even if the first intermediate pulley 36 (and the second intermediate pulley 42) is moved from the position shown by the solid line to the position shown by the chain line, the relative positional relationship between the belt 38 and the pulleys 30, 36 are not changed, though the wrapping of the belt 38 around the pulley 30 is changed from $\theta$ to $\theta'$ (in case of no slippage). The relationship among the second intermediate pulley 42, belt 48 and the input pulley 46 is the same as the drive pulley 30, belt 38 and the first intermediate pulley 36. Therefore, the state of synchronization does not change.

I claim:

1. A pressing machine including a press crank shaft rotatably supported by a press housing and driven by a motor, a material feeding device for feeding a material in synchronization with the rotation of said crank shaft and capable of moving toward and away from said crank shaft, and a torque transmission device for drivingly connecting said crank shaft and an input shaft of said material feeding device, said pressing machine comprising:

a drive pulley secured to one end of said crank shaft;
   an intermediate shaft disposed parallel to said crank shaft and said input shaft of said material feeding device, said intermediate shaft being rotatably supported by a tension adjusting device having one end rotatably supported by said crank shaft and the other end rotatably supported by said input shaft of said material feeding device;
   a first intermediate pulley secured to one end of said intermediate shaft and disposed at a position corresponding to said drive pulley, said first intermediate pulley being drivingly connected to said drive pulley through first endless torque transmission means; and
   a second intermediate pulley secured to the other end of said intermediate shaft and drivingly connected to an input pulley secured to said input shaft of said material feeding device through second endless torque transmission means;
   said tension adjusting device including a first arm member capable of effecting expansion and contraction and having one end rotatably supported by said crank shaft, a second arm member having one end rotatably supported by said input shaft of said material feeding device; and eccentric body having an inner hole formed in an eccentric relationship with an outer circumference thereof, said eccentric body rotatably supporting said intermediate shaft in said inner hole and being inserted into the other end of said first arm member and the other end of said second arm member in such a manner that the position of the eccentric body relative to the first and second arm members can be adjusted in the direction of rotation, and wherein a change in the distance between said input shaft and said crank shaft does not effect changes in the distance between said intermediate and crank shafts and between said intermediate and input shafts.

2. A pressing machine according to claim 1, wherein said first arm member comprises two arm portions each of which is rotatably supported by said crank shaft and said eccentric body, and a tension rod connecting said two arm portions in a manner to be capable of adjusting the distance between said two arm portions.

3. A pressing machine according to claim 1, wherein said second arm member comprises an adjusting plate having one end releasably secured to said eccentric body and the other end rotatably connected to said input shaft of said material feeding device.

* * * * *